(12) United States Patent
Kim

(10) Patent No.: US 10,134,010 B2
(45) Date of Patent: Nov. 20, 2018

(54) METHOD, SERVER AND COMPUTER-READABLE RECORDING MEDIUM FOR PROVIDING USER INTERFACE FOR RECORDING AND MANAGING USER-RELATED INFORMATION

(71) Applicant: Woojae Kim, Seoul (KR)

(72) Inventor: Woojae Kim, Seoul (KR)

(*) Notice: Subject to any disclaimer, the term of this patent is extended or adjusted under 35 U.S.C. 154(b) by 0 days.

(21) Appl. No.: 15/103,342

(22) PCT Filed: Dec. 10, 2014

(86) PCT No.: PCT/KR2014/012093
§ 371 (c)(1),
(2) Date: Jun. 10, 2016

(87) PCT Pub. No.: WO2015/088231
PCT Pub. Date: Jun. 18, 2015

(65) Prior Publication Data
US 2016/0314436 A1    Oct. 27, 2016

(30) Foreign Application Priority Data
Dec. 10, 2013 (KR) .................. 10-2013-0153319

(51) Int. Cl.
*G06Q 10/10* (2012.01)
*G06Q 10/06* (2012.01)
(Continued)

(52) U.S. Cl.
CPC ....... *G06Q 10/1053* (2013.01); *G06F 3/0482* (2013.01); *G06F 3/04842* (2013.01); *G06Q 10/06* (2013.01); *G06Q 10/105* (2013.01)

(58) Field of Classification Search
CPC .................. G06Q 10/1053; G06Q 10/105
(Continued)

(56) References Cited

U.S. PATENT DOCUMENTS

2003/0177027 A1    9/2003  DiMarco
2004/0133546 A1*   7/2004  Oni .................. G06Q 10/10
(Continued)

FOREIGN PATENT DOCUMENTS

JP    2005-242619 A    9/2005
JP    2008-217448 A    9/2008
(Continued)

*Primary Examiner* — Jonathan P Ouellette
(74) *Attorney, Agent, or Firm* — Xsensus, LLP

(57) ABSTRACT

A method for providing user interface to manage a user's information is disclosed. The method includes steps of: providing a baseline including a meaning of time series; acquiring information on start points of time or end points of time regarding new personal histories or new personal goals if the new personal histories or the new personal goals are inputted by the user; displaying one or more main areas for indicating existence of main information to indicate that one or more contents related to the personal histories or the personal goals have been inputted at one or more positions on the baseline or around the one or more positions, wherein the one or more positions are determined to correspond to the acquired one or more pieces of information on the start points of time or the end points of time.

28 Claims, 7 Drawing Sheets

(51) Int. Cl.
*G06Q 30/08* (2012.01)
*G06F 3/0482* (2013.01)
*G06F 3/0484* (2013.01)

(58) Field of Classification Search
USPC .................................................. 705/1.1–912
See application file for complete search history.

(56) References Cited

U.S. PATENT DOCUMENTS

| | | | |
|---|---|---|---|
| 2007/0160964 A1* | 7/2007 | Albertsson | G06Q 10/105 434/219 |
| 2007/0190504 A1* | 8/2007 | Schwartz | G09B 19/00 434/219 |
| 2008/0244453 A1* | 10/2008 | Cafer | G06F 3/04817 715/835 |
| 2009/0293074 A1* | 11/2009 | Rohwer | G06Q 10/06 719/328 |
| 2010/0100427 A1* | 4/2010 | McKeown | G06Q 10/067 705/322 |
| 2011/0161139 A1* | 6/2011 | Maheshwari | G06Q 10/06 705/7.42 |
| 2011/0276507 A1* | 11/2011 | O'Malley | G06Q 10/00 705/321 |
| 2012/0022949 A1* | 1/2012 | George | G06Q 10/103 705/14.66 |
| 2012/0079408 A1* | 3/2012 | Rohwer | G06Q 10/06 715/772 |
| 2012/0288843 A1* | 11/2012 | Shaffer | G09B 7/02 434/350 |
| 2012/0316962 A1* | 12/2012 | Rathod | G06F 17/30861 705/14.54 |
| 2014/0032279 A1* | 1/2014 | Zanichelli | G06Q 10/1053 705/7.42 |
| 2014/0089219 A1* | 3/2014 | Mathews | G06Q 10/06 705/327 |
| 2014/0223338 A1* | 8/2014 | Okocha | G06Q 10/10 715/762 |
| 2015/0100638 A1* | 4/2015 | Cofield | G06Q 50/10 709/204 |

FOREIGN PATENT DOCUMENTS

| | | |
|---|---|---|
| JP | 2012-164016 A | 8/2012 |
| KR | 1020120138494 | 12/2012 |
| WO | 2013/009710 | 1/2013 |

* cited by examiner

FIG. 4

| WORK EXPERIENCE (MATTERS THAT REQUIRE ATTENTION) |

| CAREER DATA 1 | CAREER DATA 2 | CAREER DATA 3 | CAREER DATA 4 | CAREER DATA 5 | CAREER DATA 6 |

- ⓐ MAIN INFORMATION
- ⓑ SELF-INTRODUCTION
- ⓒ ACADEMIC ABILITY
- ⓓ WORK EXPERIENCE
- ⓔ EXTRA ACTIVITY
- ⓕ TEST AND CERTIFICATE

NAME OF COMPANY*  REGION*  COUNTRY*
[            ]   [      ]  [PLEASE SELECT ▽]

WORKING PERIOD*
[YYYY]/[MM]/[YYYY]/[MM]  ☐ (IN OFFICE)

INDUSTRIAL GROUP*
[PLEASE SELECT ▽]

WORKING GROUP*
[PLEASE SELECT ▽]

TYPE OF EMPLOYMENT*
[PLEASE SELECT ▽]

DEPARTMENT  JOB  A NUMBER OF PEOPLE IN DEPARTMENT
[        ]  [ ]  [BOSS]/[COLLEAGUE]/[SUBORDINATE]

REASON FOR INTENTION TO JOIN A COMPANY
[                                        ]

MAJOR RESPONSIBILITIES +
AWARD WINNING CAREER +

[CANCEL] [SUBMIT]

FIG. 5

| | WORK EXPERIENCE (MATTERS THAT REQUIRE ATTENTION) |
|---|---|
| | CAREER DATA 1 / CAREER DATA 2 / CAREER DATA 3 / CAREER DATA 4 / CAREER DATA 5 / CAREER DATA 6 / ADD COMPANY |

- ⓐ MAIN INFORMATION
- ⓑ SELF-INTRODUCTION
- ⓒ ACADEMIC ABILITY
- ⓓ WORK EXPERIENCE
- ⓔ EXTRA ACTIVITY
- ⓕ TEST AND CERTIFICATE

ESPN
2011.11-2012.07
INDUSTRIAL GROUP: ENTERTAINMENT/SPORTS
WORKING GROUP: DESIGN, ARCHITECTURE/EXHIBIT/SPACE DESIGN
TYPE OF EMPLOYMENT: REGULAR WORKER
DEPARTMENT: DIGITAL MEDIA  JOB: DESIGNER
A NUMBER OF PEOPLE IN DEPARTMENT:
 4 BOSSES, 25 COLLEAGUES, 0 SUBORDINATES

REASON FOR INTENTION TO JOIN A COMPANY
I HAVE BEEN INTERESTED IN ENTERTAINMENT FIELD~~~   — 510

MAJOR RESPONSIBILITIES

- ■ A DRAFT DESIGN FOR LOGO OF "BAD QUARTERBACK LEAGUE – BQBL" OF GRANTLAND WHICH IS ONE OF THE AFFILIATES OF ESPN — 520
- ■ SELF-STUDY WITH REGARD TO CSS AND HTML — 525
- ■ A DRAFT DESIGN FOR USER INTERFACE ~~ — 530
- ■ A DRAFT DESGIN FOR ESPN FC WEBSITE — 535
- ■ ESPN FC : UEFA 2012 MANAGING WEBSITE DESIGNING AND SMARTPHONE APPLICATION DEVELOPMENT — 540

AWARD WINNING CAREER
ESPN DESIGNER OF THE MONTH AWARD : 2012.04
■ ~~~   — 550

[MODIFY]

METHOD, SERVER AND COMPUTER-READABLE RECORDING MEDIUM FOR PROVIDING USER INTERFACE FOR RECORDING AND MANAGING USER-RELATED INFORMATION

CROSS REFERENCE TO RELATED APPLICATIONS

This application is a U.S. National Phase Application of International Application No. PCT/KR2014/012093 filed on Dec. 10, 2014, which claims the benefit of priority from Korean Patent Application 10-2013-0153319 filed on Dec. 10, 2013. The disclosures of International Application No. PCT/KR2014/012093 and Korean Patent Application 10-2013-0153319 are incorporated herein by reference.

FIELD OF THE INVENTION

The present invention relates to a method, a server, and a computer-readable medium for providing user interface (UI) for recording and managing a user's information; and more particularly, to the method, the server, and the computer-readable medium for providing the UI for allowing information on individual users' personal histories to be visually recognized at a glance and be effectively indicated by acquiring information on start points of time or end points of time related to one or more new histories or one or more new goals inputted by the user, and displaying one or more main areas for indicating existence of main information to indicate that one or more contents related to the one or more histories or the one or more goals at one or more positions on a baseline or around the one or more positions, wherein the one or more positions are determined to correspond to the acquired one or more pieces of information on the start points of time or the end points of time.

BACKGROUND OF THE INVENTION

In general, to hire employees, a company follows procedures for posting a job opening at its website, etc., receiving resumes from many job applicants through the website, etc., reviewing them, having person-to-person interviews according to the review result and then finally hiring employees it wants to employ.

Under the conventional employment system, because such a company reviews only resumes arbitrarily prepared by applicants, even though the applicants fill out false facts in the resumes, the company cannot rapidly discriminate proper resumes from false ones in advance, and it cannot but take losses accordingly.

In particular, it is common to simply describe a personal statement, academic background, work experience, etc. in a personal resume. So the companies cannot identify specific capabilities (e.g., an ability of performing work, morality, faithfulness, harmony with colleagues, personality, adaptability at work, etc.) as well as objective additional information (e.g., an actual reason for retirement from former company, etc.) required to hire employees before they hire them and let them work for a certain period of time and they finally cannot but take a variety of losses and damages caused by hire of unqualified employees. To solve the aforementioned problems, the Korean Patent Laid-Open Publication No. 10-2012-0138494 suggests "an apparatus and a method for managing resumes by using SNS authentication" which discloses an apparatus and a method for providing more reliable information of users but the Korean Patent Laid-Open Publication No. 10-2012-0138494 has drawbacks in that separate authentication procedures are required to provide more reliable information.

Furthermore, it had a more significant problem in the existing resumes and the employment system as follow: difficulties of HR staffs in reading every resume to determine new employees are excessive because their personal histories, etc. are described lengthily in a form of text. Accordingly, it was really difficult to choose most qualified persons among a lot of applicants.

SUMMARY OF THE INVENTION

It is an object of the present invention to solve all the aforementioned problems.

It is another object of the present invention to clearly identify a user's general personal history matters at a glance by visually displaying a baseline including a meaning of time series, main areas for indicating existence of main information, etc. to indicate the user's personal history matters.

It is still another object of the present invention to prevent the user from changing any of personal history matters by preventing an authority to delete the already inputted personal goal(s) from being provided to the user.

It is still yet another object of the present invention to improve reliability of the user's information by allowing the user to attach contents with which the personal history(s) or personal goal(s) inputted by the user is proved.

In accordance with one aspect of the present invention, there is provided a method for providing user interface to record and manage a user's information, including steps of: (a) providing a baseline including a meaning of time series; (b) acquiring one or more pieces of information on start points of time or end points of time regarding one or more new personal histories or one or more new personal goals if the one or more new personal histories or the one or more new personal goals are inputted by the user; (c) displaying one or more main areas for indicating existence of main information to indicate that one or more contents related to the one or more personal histories or the one or more personal goals have been inputted at one or more positions on the baseline or around the one or more positions, wherein the one or more positions are determined to correspond to the acquired one or more pieces of information on the start points of time or the end points of time.

In accordance with another aspect of the present invention, there is provided a server for providing user interface to record and manage a user's information to the user terminal, including: a template providing part for providing a template for displaying a baseline including a meaning of time series and displaying one or more main areas for indicating existence of main information to indicate that one or more contents regarding one or more new personal histories or one or more new personal goals are inputted by the user, wherein the main areas are displayed by referring to the baseline; a time cue acquiring part for acquiring one or more pieces of information on start points of time or end points of time regarding one or more new personal histories or one or more new personal goals inputted by the user; and a user information exposing part for displaying the one or more main areas for indicating existence of main information according to information on the template provided by the template providing part to indicate that one or more contents regarding one or more personal histories or one or more personal goals have been inputted at one or more positions on the baseline or around the one or more positions, wherein the one or more positions are determined to correspond to the acquired one or more pieces of information on the start points of time or the end points of time.

BRIEF DESCRIPTION OF THE DRAWINGS

The above and other objects and features of the present invention will become apparent from the following description of preferred embodiments given in conjunction with the accompanying drawings, in which:

FIGS. 4 and 5 are diagrams exemplarily showing user interface by which contents regarding the user's personal histories can be inputted in accordance with one example embodiment of the present invention.

DETAILED DESCRIPTION OF THE PREFERRED EMBODIMENTS

Figure 1:
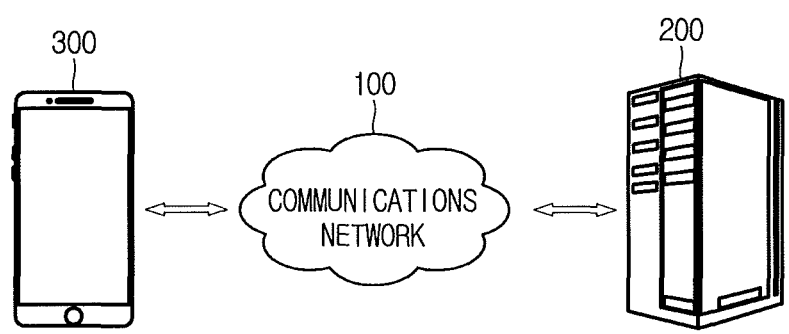
FIG. 1 is a diagram showing an overall configuration of a whole system with which a user's information is recorded and managed in accordance with one example embodiment of the present invention.

To make purposes, technical solutions, and advantages of the present invention clear, reference is made to the accompanying drawings that show, by way of illustration, more detailed example embodiments in which the invention may be practiced. These embodiments are described in sufficient detail to enable those skilled in the art to practice the invention.

It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Detailed explanation will be made by referring to the attached drawings with respect to the desirable example embodiments of the present invention to make those skilled in the art practice the invention.

FIG. 1 is a diagram showing an overall configuration of a whole system with which a user's information is recorded and managed in accordance with one example embodiment of the present invention.

As illustrated in FIG. 1, the whole system in accordance with one example embodiment of the present invention may be configured with a communications network, a user terminal, and a server.

First of all, the communications network 100 in accordance with one example embodiment of the present, invention may be configured in a form of wired or wireless communications and may be configured with a variety of communications networks including a wide area network (WAN), a local area network (LAN), a telecommunication network, an artificial satellite communication network, etc. More preferably, the communications network 100 in the present invention may include wireless communications networks implemented by technologies such as IEEE 802.11, code division multiple access (CDMA), wideband code division multiple access (WCDMA), global system for mobile communications (GSM), and long term evolution (LTE). However, the communications network 100 may also include at least part of a publicly known wireless communication network or a publicly known telephone network without being limited only to these.

Next, the server 200 in accordance with one example embodiment of the present invention may perform a function of receiving the user's information, e.g., one or more contents regarding the user's one or more personal histories or one or more personal goals, from the user terminal 300 through the communications network, providing a baseline meaning an order of time series in the user terminal 300, and providing a template including unit areas through which one or more main areas for indicating existence of main information or one or more sub areas for indicating existence of subordinate information on the user's one or more personal histories or one or more personal goals are displayed. Herein, it is meant that one or more main areas for indicating existence of main information are areas created when one or more new personal histories are additionally inputted differently from the user's one or more existing basic personal histories, and one or more sub areas for indicating existence of subordinate information are areas created when detailed personal histories subordinate to one or more certain basic personal histories that have been inputted before.

The more detailed explanation on the configuration and functions of the server 200 in accordance with the present invention will be made below.

The user terminal 300 in accordance with one example embodiment of the present invention is a digital device that includes a function of accessing and communicating with a server and any digital devices including a desktop computer, a laptop computer, a workstation, a PDA, a webpad, a mobile phone, etc., which have memory means and processors with a calculation ability, may be adopted as the user terminal 300 in accordance with the present invention. In particular, the user terminal 300 may include a program for a browser to get interface for recording and managing the user's information provided by the server 200.

The internal configuration and functions of components of the server will be looked at below.

Figure 2:
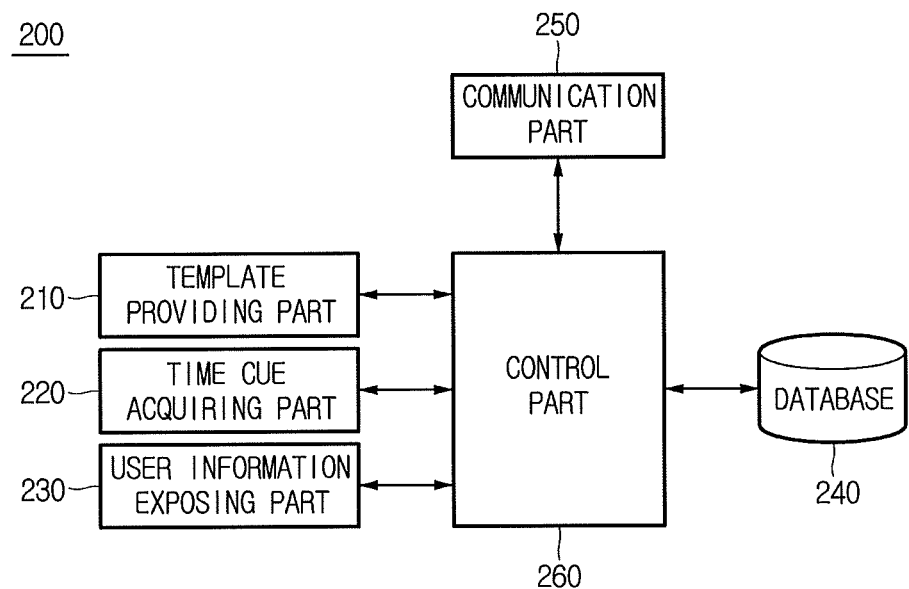
FIG. 2 is a drawing illustrating an internal configuration of a server in details in accordance with one example embodiment of the present invention.

FIG. 2 is a drawing illustrating an internal configuration of a server in details in accordance with one example embodiment of the present invention.

As illustrated in FIG. 2, the server 200 in accordance with one example embodiment of the present invention may include a template providing part 210, a time cue acquiring part 220, a user information exposing part 230, database 240, a communication part 250, and a control part 260 where all of the template providing part 210, the time cue acquiring part 220, the user information exposing part 230, the database 240, the communication part 250, and the control part 260 are not necessary to be physically included in the server 200, and they could be located outside interoperating with the server 200. In accordance with one example embodiment of the present invention, the template providing part 210, the time cue acquiring part 220, the user information exposing part 230, the database 240, the communication part 250, and the control part 260 may be program modules, at least some which communicate with the user terminal 300. Such program modules may be included in the server 200 in a form of an operating system, an application program module, or other program module, and may be stored physically in various memory devices. Besides, such a program module may be also stored in a remote memory device that can communicate with the user terminal 300. Such a program module includes a routine, a sub-routine, a program, an object, a component, a data structure, etc, that perform specific work to be explained later or execute a certain type of abstract data in accordance with the present invention, but it is not limited to this.

First of all, the template providing part 210 in accordance with one example embodiment of the present invention may allow a template where a baseline including a meaning of time series and unit areas (which are assumed to be hexagonal as an example in FIGS. 3, and 6) are indicated to be displayed through the user terminal 300. In this specification, if the user's personal history(s) or personal goal(s) is inputted, each of the unit areas may play a role as a basic frame where one or more main areas for indicating existence of main information or one or more sub areas for indicating existence of subordinate information are displayed to indicate that the user's personal history(s) or personal goal(s) has been inputted.

Even if the one or more main areas for indicating existence of main information and the one or more sub areas for indicating existence of subordinate information are not created at all, the template providing part 210 may allow the baseline to be displayed and allow lattice-shaped empty unit areas to be displayed at the same time. Whenever the user's one or more personal histories or one or more personal goals are inputted, it may allow one or more main areas for indicating existence of main information or the one or more sub areas for indicating existence of subordinate information to be displayed through corresponding certain unit areas. Detailed explanation will be given below with respect to a case in which the one or more main areas or the one or more sub areas are displayed in the certain unit areas.

Meanwhile, the template providing part 210 may allow multiple unit areas to be displayed on a screen in a shape of lattice. For example, the respective unit areas may be hexagonal, and may be displayed with the respective unit areas being contacted with one another.

The template providing part 210 may provide the template including the baseline and multiple unit areas and further provide UI for allowing the user to attach one or more contents to prove one or more corresponding personal histories or one or more corresponding personal goals in the respective main areas and the respective sub areas, and for allowing information on the user's personal histories or the user's personal goals to be inputted.

Next, if one or more new personal histories or one or more new personal goals are inputted by the user, the time cue acquiring part 220 in accordance with one example embodiment of the present invention may perform a function of searching and acquiring one or more pieces of information on start points of time or end points of time regarding said one or more new personal histories or said one or more new personal goals inputted by the user. The time information acquired by the time cue acquiring part 220 may be used to specify one or more appropriate unit areas among all the unit areas in the template. Herein, the one or more appropriate unit areas are locations where the respective main areas or the respective sub areas are displayed, which will be explained later.

In this specification, the start points of time or the end points of time regarding a new personal history or a new personal goal may be related to a period when the new personal history is carried out. For example, if an inputted new personal history relates to the user's academic background, it could represent a time of performing studies. In addition, if a new personal goal is inputted, the time information on the personal goal could represent a time of setting the personal goal or a time of achieving the personal goal the user wants.

Next, if one or more new personal histories or one or more new personal goals are inputted by the user, the user information exposing part 230 may perform a function of displaying the one or more main areas for indicating existence of main information on the new personal histories or the new personal goals. The user information exposing part 230 may allow the one or more main areas for indicating existence of main information to be created and displayed at one or more positions on the baseline or around the one or more positions, wherein the one or more positions are determined to correspond to the one or more pieces of information on the start points of time or the end points of time acquired by the time cue acquiring part 220. Herein, if there are multiple main areas for indicating existence of main information on the new personal histories or the new personal goals, the multiple main areas may be allowed to be placed and displayed by referring to time information of the baseline.

Besides, after a specific main area for indicating existence of main information on a specific personal history has been created, if one or more subordinate personal histories belonging to the specific personal history are inputted, the user information exposing part 230 may further perform a function of displaying one or more sub areas for indicating existence of subordinate information to indicate that one or more contents of the subordinate personal histories near the specific main area for indicating existence of main information on the specific personal history. For example, after a specific personal history that a user entered and graduated from School 'A' is inputted and a specific main area for indicating existence of main information on the specific personal history has been created, if at least one content(s) of a project(s) carried or an award(s) received at School A is inputted by the user as a subordinate personal history belonging to the specific personal history, sub areas for indicating existence of subordinate information may be allowed to be displayed around the specific main area (e.g., through appropriate unit areas located near specific unit areas where the specific main area is displayed). In addition, as explained below, the user information exposing part 230 may also perform a function of displaying one or more main areas for indicating existence of main information and one or more sub areas for indicating existence of subordinate information in different colors depending on property categories of respective personal histories.

Next, in the database 240 in accordance with one example embodiment of the present invention, one or more contents of the one or more personal histories or the one or more personal goals inputted by the user may be stored. In FIG. 2, it is illustrated that the database 240 is included in the server 200, but may be configured separately from the server 200, depending on the need of those skilled in the art who practice the present invention. Meanwhile, the database 240 in the present invention may be not only a narrow meaning of database as a concept that includes a computer-readable recording medium but also a wide meaning of database that includes data records based on a file system. Even a simple set of logs which can search and extract data may be the database 240 in the present invention.

In accordance with one example embodiment of the present invention, the communication part 250 may perform a function of transmitting and receiving data to/from the template providing part 210, the time cue acquiring part 220, the user information exposing part 230, and the database 240 or perform a function of allowing the user terminal 300 and the server 200 to communicate with each other.

Lastly, the control part 260 in accordance with one example embodiment of the present invention may perform a function of controlling flow of data between the template providing part 210, the time cue acquiring part 220, the user information exposing part 230, the database 240, and the communication part 250. In other words, the control part 260 in accordance with the present invention may control data flow from/to outside of the server 200 or among individual components of the server 200 to allow the template providing part 210, the time cue acquiring part 220, the user information exposing part 230, the database 240, and the communication part 250 to perform their unique functions.

By referring to FIGS. 3 to 7, UI provided in accordance with one example embodiment of the present invention will be explained in more details below.

Figure 3:
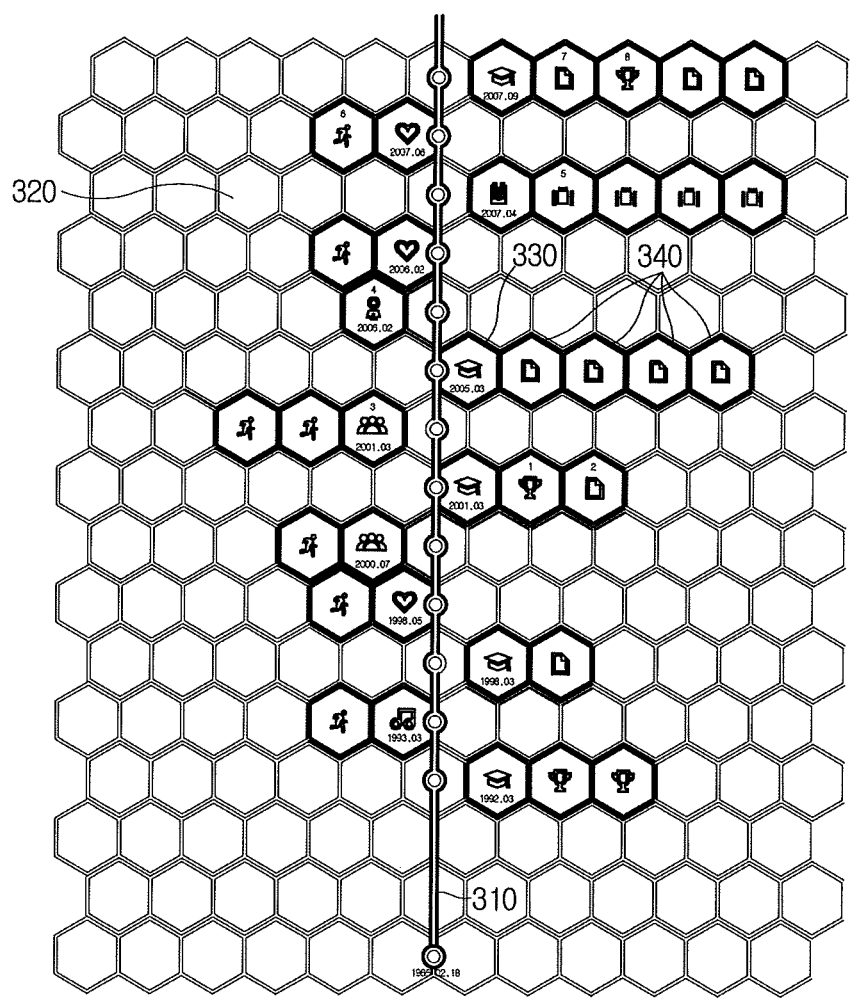
FIG. 3 is a drawing exemplarily explaining that one or more main areas for indicating existence of main information and one or more sub areas for indicating existence of subordinate information have been created and displayed through a template provided to a user in accordance with one example embodiment of the present invention.

FIG. 3 is a drawing exemplarily explaining that the one or more main areas for indicating existence of main information and the one or more sub areas for indicating existence of subordinate information are located on a template in accordance with one example embodiment of the present invention.

By referring to FIG. 3, a baseline which has a meaning of time series is marked with reference no. 310, but it would not be necessary to be a straight line. In FIG. 3, the lowest part of the baseline 310 refers to the birthdate of the user and as a point on the baseline 310 becomes closer to the highest part of the baseline 310, a point of time becomes closer to the present time. Besides, if a personal history or a personal goal at a specified time is inputted, a main area 330 for indicating existence of main information or sub areas 340 for indicating existence of subordinate information could be displayed through unit areas near a position corresponding to the specified time on the baseline 310. Herein, reference no. 320 means a hexagonal unit area included in a template and the main area 330 for indicating existence of main information is an area displayed through a unit area located closest to the baseline 310. The main area could correspond to an area that adheres to the baseline 310 or also an area that adheres to a hexagon half cut by the baseline 310. Besides, unit areas directly or indirectly adhere to the main area 330 for indicating existence of main information would be sub areas 340 for indicating existence of subordinate information.

By referring to FIG. 3 again, the template displayed in the user terminal may include the baseline 310 and the multiple unit areas 320. Before information on the user's personal history(s) or personal goal(s) is inputted, the baseline 310 and only the multiple unit areas 320 that have visual effects of showing their inner parts to be empty may be displayed. As the case may be, the unit areas 320 may not be displayed on a screen. If a new personal history or a new personal goal is inputted or one or more contents of one or more subordinate personal histories, i.e., one or more detailed personal histories, corresponding to the already created main area for indicating existence of main information are inputted, the multiple main area 330 for indicating existence of main information or the one or more sub areas 340 for indicating existence of subordinate information may be created and displayed through unit areas at proper positions among the unit areas whose inner parts have been empty.

More specifically, if a specific personal history or a specific personal goal is inputted, the main area 330 for indicating existence of main information on the specific personal history or the specific personal goal may be displayed through a certain unit area determined by referring to the information on start points of time or end points of time acquired by the time cue acquiring part 220. If multiple main areas for indicating existence of main information are necessary to be placed, the multiple main areas for indicating existence of main information may be displayed at positions which are determined to correspond to both information on the start points of time or the end points of time of personal histories or personal goals corresponding thereto and the time information of the baseline. Accordingly, this allows the multiple main areas for indicating existence of main information to be displayed in serial order along a direction of the baseline. Herein, with respect to a detailed methodology of a process of inputting the respective new personal histories or the respective new personal goals, it could be assumed that the user may input texts, etc. regarding his or her personal histories or personal goals through UI such as shown in FIGS. 4 and 5 through a screen provided separately from the UI as shown in FIG. 3 and as another example, it could be also brought up that the user attempts to input his or her personal histories or personal goals by directly selecting (e.g., by mouse-clicking) a certain unit area(s) among the multiple lattice-shaped unit areas on the screen where the UI as shown in FIG. 3 is provided. In the former, after the time cue acquiring part 220 analyzes texts inputted by the user and then extracts information on start points of time or end points of time, the user information exposing part 230 could display one or more main areas for indicating existence of main information or one or more sub areas for indicating existence of subordinate information through certain unit areas determined by referring to the extracted information. In the latter, because time information are granted in one or more certain unit areas directly selected by the user, the user information exposing part 230 could display the one or more main areas for indicating existence of main information or the one or more sub areas for indicating existence of subordinate information through the certain unit areas. However, explanation will be made mainly based on the former in the specification.

If one or more new personal goals are inputted, an effect of visually indicating that the new personal goals have not been achieved yet is displayed in the main area for indicating existence of main information corresponding to the new personal goals. For example, in order to indicate that the one or more personal goals are now in progress, it would be possible to produce an effect of making the corresponding one or more main areas regularly blink. For reference, if the one or more main areas for the one or more personal goals are created, an authority to edit for k times may be granted but an authority to delete any created personal goals may not be granted to prevent the user from deleting the personal goals after the goals have failed to be achieved.

The main area 330 for indicating existence of main information may be displayed with a visual effect different from those 330 which have different property categories of corresponding personal histories. For example, colors in the areas may be displayed differently depending on property categories of the personal histories. In detail, as an example of property categories of the personal histories, a judicial category, a commercial category, a study category, an arts and physical education category, a design category, a media category, etc. could be assumed, but it is not limited thereto. As such, colors in the main area may be displayed differently according to information on property categories inputted by the user.

It was explained that colors in the corresponding areas are displayed differently depending on property categories, but it could be thought that even colors outside of the corresponding areas, i.e., colors of contours' of the corresponding areas, are made to be different. More specifically, the color in the main area 330 for indicating existence of main information and that outside of the main area 330 could be allowed to be displayed differently depending on information on hierarchy among property categories of personal histories. For example, when personal histories in one or more main areas for indicating existence of main information are related to a job(s), colors outside of one or more main areas for indicating existence of main information are determined by industrial group where the user's job(s) belongs and colors in the one or more main areas for indicating existence of main information could be allowed to be determined by referring to a detailed type of the job which the user was responsible for at the user's workplace. Of course, a method for determining colors may be set differently, as the case may be.

To determine a unit area to expose the main area 330 for indicating existence of main information, information on a start point or an end point of time of the new personal history or the new personal goal as well as its property category may be referred to. More specifically, the main area 330 for indicating existence of main information may be displayed on one side or on the other side of the baseline 310 according to the property category of the new personal history or the new personal goal. For example, if one or more personal histories or one or more personal goals regarding academic background and work experiences are inputted, they may be displayed on the right side of the baseline 301 as shown in FIG. 3.

Contrarily, the main area 330 for indicating existence of main information on the personal history or the personal goal excluding the academic background and the work experiences, e.g., the personal history or the personal goal related to voluntary activities, certificates, club activities, arts and physical education activities, etc., may be allowed to be displayed on the left side of the baseline 310 as shown in FIG. 3.

After the main area 330 for indicating existence of main information are displayed, if one or more subordinate personal histories with respect to a specific personal history recorded in the main area 330 are newly inputted, as illustrated in FIG. 3, the sub areas 340 for indicating existence of subordinate information may be displayed near the main area 330, i.e., through unit areas directly or indirectly adhering to the main area 330. Herein, an earlier inputted subordinate personal history among the subordinate personal histories could be allowed to be exposed in a unit area closer to the main area 330, but they are not limited to these. If subordinate personal histories are inputted in excess of the number of sub areas 340 capable of being displayed in one line, a new line immediately above or immediately below a current line on which the main area 330 is located is created. Accordingly, the sub areas 340 could be additionally displayed on the new line. At the time, it could be necessary to adjust time information of the baseline 310 due to the newly created line. As an another embodiment, it could be assumed that, even though the one or more subordinate personal histories belonging to the specific personal history have been inputted, the sub areas 340 may not be displayed immediately. For example, the sub areas 340 may be allowed to be displayed near the main area 330 just after the main area 330 is selected (e.g., just after an act of putting a mouse over, or mouse-clicking, the main area 330).

As explained above, as the sub areas 340 could be displaced on one side or on the other side of the baseline 310 depending on property categories of the personal histories in the main area 330, the sub areas 340, if it is necessary to expose them, may be displayed near the main area 330 and may be displayed on a same side of the baseline 310 as the main area 330.

The specific main area 330 with respect to a specific personal history and the sub areas 340 for indicating existence of subordinate information on the subordinate personal histories belonging to the specific personal history are set to have identical visual effects with each other by default and have different visual effects from other areas with different property categories. In accordance with one example embodiment of the present invention, a color in the specific main area and those in the sub areas may be displayed differently from those in the said other areas with the different property categories. At this time, as explained above, depending on hierarchy among the property categories corresponding to the specific personal history, the colors in the specific main area 330 and in the sub areas 340 and those outside of the specific main area 330 and the sub areas 340 may be displayed differently from those in the said other areas with the different property categories.

In accordance with one example embodiment of the present invention, the template providing part 210 may provide UI for allowing the user to attach one or more contents to prove one or more corresponding personal histories in the main area 330 and the sub areas 340. For example, if the user performed design-related work and inputs a personal history regarding the design-related work, the user may prove his or her personal history by attaching a photo(s) of the work produced by the user through the UI.

At the time, one or more areas with any documentary evidence regarding any personal history may be displayed to show visual effects differently from the remaining main areas and the remaining sub areas. For example, as illustrated in FIG. 3, the remaining main areas or the remaining sub areas without any documentary evidence could be allowed to be displayed in grey color regardless of property categories.

FIGS. 4 and 5 are diagrams exemplarily showing user interface by which contents regarding the user's personal history can be inputted in accordance with one example embodiment of the present invention.

UI as illustrated in FIG. 4 may include areas through which the name(s) of company(s) a user worked for, a region(s), a country(s), working period(s), an industrial group(s), a working group(s), a reason for intention to join a company, major responsibilities, etc. could be inputted. In FIG. 4, explanation was made on assumption that it is the UI for inputting a personal history regarding work experiences, but it is not limited to this and the UI for inputting a variety of kinds of personal histories may be provided, as the case may be.

The time cue acquiring part 220 could acquire information on start points of time or end points of time regarding one or more personal histories from information on the working period of the user among pieces of information inputted through the UI as shown in FIG. 4. Besides, the user information exposing part 230 may determine which visual effects could be applied to each of the main areas and each of the sub areas by referring to information such as industrial group(s), work group(s), etc. among pieces of information inputted through the UI as shown in FIG. 4. For example, the user information exposing part 230 may determine colors of the respective main areas and the respective sub areas.

Figure 6:
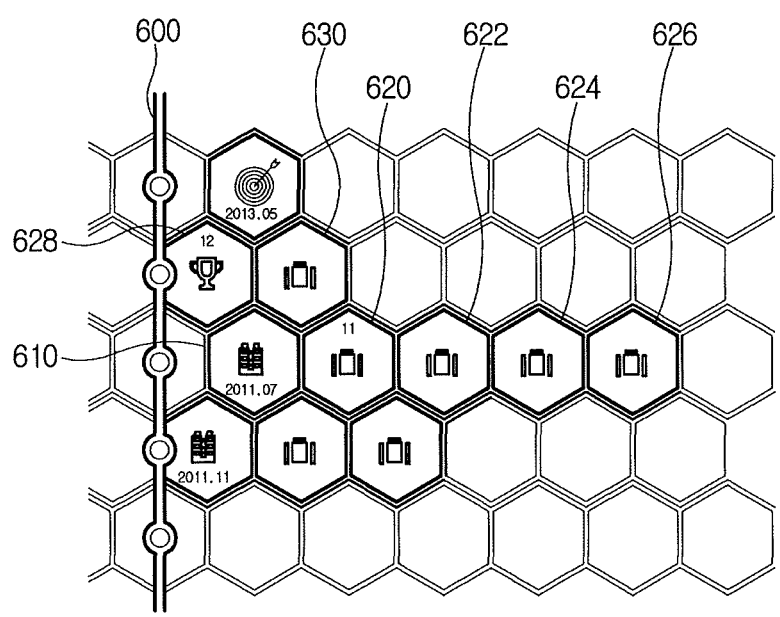
FIG. 6 is a drawing exemplarily displaying main areas and sub areas.

FIG. 5 is a drawing to explain that data related to the name(s) of company(s) the user worked for, a region(s), a country(s), working period(s), an industrial group(s), a working group(s), a reason for intention to join a company, major responsibilities, etc. are inputted by the user. If a specific personal history is inputted as illustrated in FIG. 5, a specific main area 610 for indicating existence of main information on the specific personal history and sub areas 620, 622, 624, 626, 628, and 630 for indicating existence of subordinate information may be created as illustrated in FIG. 6. For reference, an area 628 adheres to a baseline 600, but it is a sub area for indicating existence of subordinate information. This could be guessed from the fact that time information (e.g., November 2011 as described in an area 610) is not described in the area 628. (As stated above, if subordinate personal histories are inputted in excess of the number of sub areas capable of being displayed in one line, a new line can be created.)

By referring to FIGS. 5 and 6, if main information 510 on the specific personal history including the name(s) of company(s) the user worked for, working period(s), a business type(s), a work type(s), an employment type(s), a department(s), a job title(s), number of employees in the department, a reason for intention to join a company, etc. is inputted, the main area 610 for indicating existence of main information may be created in a unit area which is located around a certain point on the baseline 600. Herein, a certain point is determined by referring to time information extracted from the main information 510. At the time, as the period of the specific personal history is from November 2011 to July 2012, the main area 610 may be created in the unit area located around the certain point which is corresponding to, e.g., a start point of time, i.e., November 2011. Major responsibilities 520 to 540 and award experience 550 in FIG. 5 may be subordinate personal histories of the specific personal history, and as illustrated in FIG. 6, the sub areas 620, 622, 624, 626, 628, and 630 may be created near the main area 610.

Figure 7:
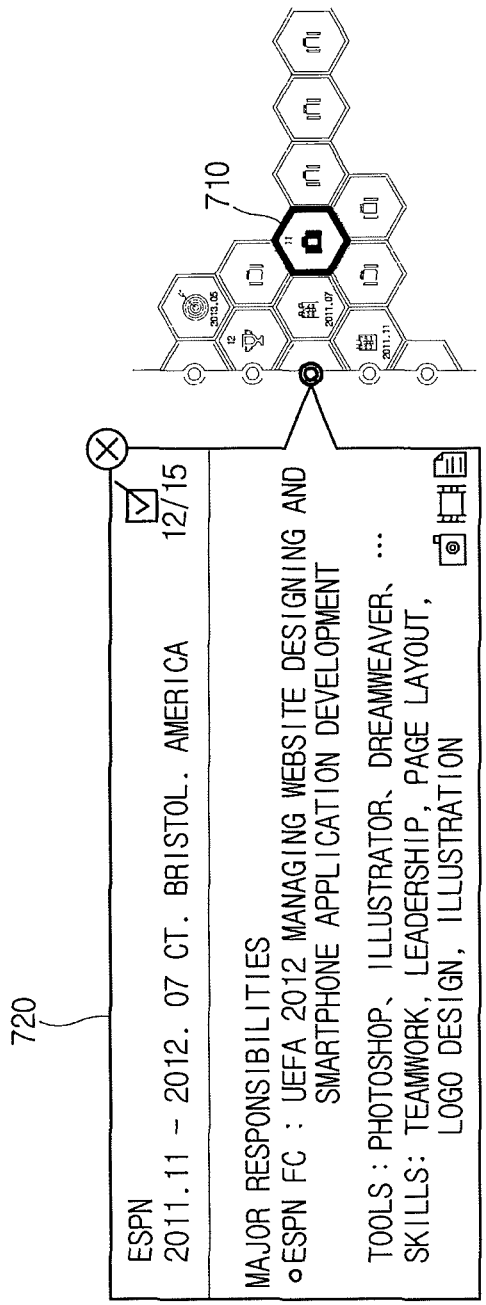
FIG. 7 is a drawing exemplarily explaining a case of selecting one area among the main areas and the sub areas in accordance with one example embodiment of the present invention.

FIG. 7 is a drawing exemplarily explaining a case of selecting one area among the main areas and the sub areas in accordance with one example embodiment of the present invention.

As illustrated in FIG. 7, if a main area or a sub area 710 displayed through a template is selected, a window 720 for providing detailed contents of a personal history or a personal goal recorded corresponding to the selected main area or the selected sub area 710 may be displayed. For reference, multiple icon shapes are displayed on the right bottom in the window 720, and if the icons are selected, a screen where a photo(s), a video(s), a pdf document as well as a program(s) developed by the user to prove the user's own personal histories, etc. could be provided.

In accordance with one example embodiment of the present invention, the user information exposing part 230 may display n pieces of personal histories or n pieces of personal goals selected among the one or more personal histories or the one or more personal goals with visual signs to indicate that they are important personal histories or important personal goals. More specifically, one or more main areas and one or more sub areas selected to be important by the user may show a regular blink effect. Additionally, detailed contents of the corresponding personal histories or personal goals may be allowed to show a visual effect of highlighting at least one important part in the detailed contents of the corresponding personal histories or personal goals on the displayed screen.

In accordance with the present invention, managers of companies may identify a user's personal history matters very easily and accurately by displaying the user's personal histories intuitively through a baseline including a meaning of time series, one or more main areas for indicating existence of main information, etc. to indicate the user's personal history matters.

In accordance with the present invention, it may prevent a user from deleting the personal history matters by depriving the user of an authority to delete any created personal goals.

In accordance with the present invention, reliability on user information may be improved by allowing a user to attach contents that can prove personal histories or personal goals.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A method for providing user interface to record and manage a user's information, comprising steps of:
   (a) a server providing a baseline including a meaning of time series;
   (b) the server acquiring and storing in a database one or more pieces of information on start points of time or end points of time regarding one or more new personal histories or one or more new personal goals if the one or more new personal histories or the one or more new personal goals are inputted by the user;
   (c) the server displaying one or more main areas for indicating existence of main information, wherein each said main area is associated with a personal history or a personal goal stored in the database to indicate that one or more contents related to the said personal history or the said personal goal have been inputted at one or more positions on the baseline or around the one or more positions, wherein the one or more positions are determined to correspond to the acquired one or more pieces of information on the start points of time or the end points of time,
   wherein the respective main areas for indicating existence of the main information are allowed to be displayed with visual effects corresponding to information on property categories of the respective personal histories,
   wherein a visual effect applied to a first main area with a first property category is different from that applied to a second main area with a second property category, and the method further comprising a step of:
   (e) the server, if one or more subordinate personal histories belonging to a specific personal history is inputted and stored in the database after a specific main area for indicating existence of main information on the specific personal history has been created, displaying one or more sub areas, wherein each said sub area is associated with a subordinate personal history in the database for indicating existence of subordinate information to indicate that one or more contents regarding the subordinate personal histories are inputted near the specific main area for indicating existence of the main information on the specific personal history;
   (g) the server allowing a viewer of the baseline to view the one or more main areas as graphical representations of the existence of the associated personal histories or personal goals, and the respective one or more sub areas to the one or more main areas as graphical representations of the existence of the associated subordinate personal histories;
   (h) the server accepting a selection from the viewer of the baseline of a main area or a sub area, and upon acceptance of such selection of such main or sub area:
      accessing the database to locate the personal history or personal goal or subordinate personal history associated with the selected main or sub area;
      retrieving the personal history or personal goal or subordinate personal history associated with the selected main or sub area
      displaying a window containing the personal history or personal goal or subordinate personal history associated with the selected main or sub area to the viewer, thereby allowing the viewer to access personal history or personal goal or subordinate personal history that were previously associated with but not displayed by the selected main or sub area;
   wherein the server displays a plurality of unit areas as slots for the one or more main areas and their corresponding sub areas, each of the plurality of unit areas being substantially adjacent with one another,
   wherein, a location of the specific main area is determined as a specific unit area among all the unit areas by referring to time information of the specific personal history which includes information on a start point of time thereof or an end point of time thereof, and
   wherein locations of the one or more sub areas corresponding to the specific main area are determined as a group of unit areas, which are located near the specific main area and branching away from the baseline, among all the unit areas by comparing time information and category information of the subordinate personal histories with those of the specific personal history.

2. The method of claim 1, comprising a step of:
   (d) the server providing a detailed content of a specific personal history or a specific personal goal recorded corresponding to a specific main area which is selected among the displayed main areas for indicating existence of the main information.

3. The method of claim 1, wherein the respective main areas for indicating existence of the main information are allowed to be displayed in different colors depending on the information on property categories of the respective personal histories.

4. The method of claim 3, wherein colors in the respective main areas for indicating existence of the main information and those outside of the respective main areas for indicating existence of the main information are allowed to be displayed differently depending on information on hierarchy among property categories of the respective personal histories.

5. The method of claim 1, wherein, at the step of (e), if the specific main area for indicating existence of the main information on the specific personal history is selected after the subordinate personal histories belonging to the specific personal history are inputted, the sub areas for indicating existence of subordinate information are displayed to indicate that the contents regarding the subordinate personal histories are inputted near the specific main area for indicating existence of the main information on the specific personal history.

6. The method of claim 1, wherein the specific main area for indicating existence of the main information on the specific personal history and the sub areas for indicating existence of subordinate information on the subordinate personal histories belonging to the specific personal history are set to have identical visual effects with each other by default and have different visual effects from other areas with different property categories.

7. The method of claim 6, wherein a color in the specific main area for indicating existence of main information on the specific personal history and those in the sub areas for indicating existence of subordinate information on the subordinate personal histories belonging to the specific personal history are displayed differently from those in the said other areas with the different property categories.

8. The method of claim 7, wherein the colors in the specific main area for indicating existence of the main information on the specific personal history and in the sub areas for indicating existence of subordinate information on the subordinate personal histories belonging to the specific personal history and those outside of the specific main area for indicating existence of the main information on the specific personal history and the sub areas for indicating existence of subordinate information on the subordinate personal histories belonging to the specific personal history are displayed differently from those in the said other areas with the different property categories.

9. The method of claim 6, wherein at least one area without any documentary evidence related to the specific personal history among the specific main area for indicating existence of the main information on the specific personal history and the sub areas for indicating existence of subordinate information on the subordinate personal histories belonging to the specific personal history are displayed to show visual effects differently from the remaining main areas and the remaining sub areas with any documentary evidence related to the specific personal history.

10. The method of claim 1, further comprising a step of:
(f) the server providing user interface for allowing a user to attach one or more contents to prove one or more corresponding personal histories in the respective main areas for indicating existence of main information and the respective sub areas for indicating existence of subordinate information.

11. The method of claim 1, wherein n pieces of personal histories or n pieces of personal goals selected among the one or more personal histories or the one or more personal goals are displayed with visual signs to indicate that they are important personal histories or important personal goals.

12. The method of claim 11, wherein a corresponding main area for indicating existence of main information on the n pieces of selected personal histories or the n pieces of selected personal goals is displayed to regularly show a blink effect or an effect of highlighting at least one important part of detailed contents of the selected personal histories or the selected personal goals.

13. The method of claim 1, wherein one or more main areas for indicating existence of main information on academic background, work experiences, and one or more personal goals related thereto are displayed on one side of the baseline, and one or more main areas for indicating existence of main information on one or more personal histories and one or more personal goals excluding the academic background, the work experiences, and the one or more personal goals related thereto are displayed on the other side of the baseline.

14. The method of claim 13, wherein, after a specific main area for indicating existence of main information on a specific personal history has been created, if one or more subordinate personal histories regarding the specific personal history are inputted, one or more sub areas for indicating existence of subordinate information are displayed to indicate that one or more contents related to the subordinate personal histories are inputted near the specific main area for indicating existence of the main information on the specific personal history on the identical side of the baseline.

15. The method of claim 1, wherein a screen for providing user interface where one or more contents related to one or more personal histories of the user are capable of being inputted is provided separately from a screen where the baseline and the main areas for indicating existence of main information on the one or more personal histories are displayed and one or more pieces of information on start points of time or end points of time regarding the one or more personal histories are acquired from one or more pieces of information inputted through the screen for providing the user interface.

16. The method of claim 1, wherein, even if the one or more main areas for indicating existence of main information and the one or more sub areas for indicating existence of subordinate information do not exist at all, the baseline is displayed and, at the same time, lattice-shaped empty unit areas are displayed.

17. The method of claim 16, wherein the one or more main areas for indicating existence of main information and the one or more sub areas for indicating existence of subordinate information are displayed through one or more certain unit areas determined by referring to the start points of time or the end points of time regarding the one or more personal histories or the one or more personal goals corresponding to the created one or more main areas for indicating existence of the main information and the created one or more sub areas for indicating existence of subordinate information.

18. The method of claim 16, wherein the one or more main areas for indicating existence of the main information and the one or more sub areas for indicating existence of subordinate information are displayed through the one or more certain unit areas selected by the user on the screen of the lattice-shaped unit areas.

19. The method of claim 16, wherein the respective unit areas are hexagonal, and are displayed in a shape of the respective unit areas close to each other.

20. The method of claim 1, wherein, if one or more new personal goals are inputted, an effect of visually indicating that the new personal goals have not been achieved yet is displayed in the main area for indicating existence of main information corresponding to the new personal goals.

21. The method of claim 1, wherein, if the one or more main areas for indicating existence of the main information on the one or more personal goals are created, an authority to edit for k times is granted but an authority to delete is not granted.

22. A server for providing user interface to record and manage a user's information to the user terminal, comprising:
a template providing part for providing a template for displaying a baseline including a meaning of time series and displaying one or more main areas for indicating existence of main information, wherein each said main area is associated with a personal history or a personal goal stored in a database to indicate that one or more contents regarding said personal history or said personal goal are inputted by the user, wherein the main areas are displayed by referring to the baseline;
a time cue acquiring part for acquiring and storing in the database one or more pieces of information on start points of time or end points of time regarding one or more new personal histories or one or more new personal goals inputted by the user;
a user information exposing part for displaying the one or more main areas for indicating existence of main information according to information on the template provided by the template providing part to indicate that one or more contents regarding one or more personal histories or one or more personal goals have been inputted at one or more positions on the baseline or around the one or more positions, wherein the one or more positions are determined to correspond to the acquired one or more pieces of information on the start points of time or the end points of time,
wherein the user information exposing part allows the respective main areas for indicating existence of the main information to be displayed with visual effects corresponding to' information on property categories of the respective personal histories, wherein the user information exposing part allows a visual effect applied to a first main area with a first property category to be different from that applied to a second main area with a second property category:

wherein the server, if one or more subordinate personal histories belonging to a specific personal history is inputted and stored in the database after a specific main area for indicating existence of main information on the specific personal history has been created, displaying one or more sub areas, wherein each sub area is associated with a subordinate personal history in the database for indicating existence of subordinate information to indicate that one or more contents regarding the subordinate personal histories are inputted near the specific main area for indicating existence of the main information on the specific personal history, allowing, via the server, a viewer of the baseline to view the one or more main areas as graphical representations of the existence of the associated personal histories or personal goals, and the respective one or more sub areas to the one or more main areas as graphical representations of the existence of the associated subordinate personal histories;

accepting, by the server, a selection from the viewer of the baseline of a main area or a sub area, and upon acceptance of such selection of such main or sub area:
    accessing the database to locate the personal history or personal goal or subordinate personal history associated with the selected main or sub area;
    retrieving the personal history or personal goal or subordinate personal history associated with the selected main or sub area
    displaying a window containing the personal history or personal goal or subordinate personal history associated with the selected main or sub area to the viewer, thereby allowing the viewer to access personal history or personal goal or subordinate personal history that were previously associated with but not displayed by the selected main or sub area;

wherein the server displays a plurality of unit areas as slots for the one or more main areas and their corresponding sub areas, each of the plurality of unit areas being substantially adjacent with one another, wherein, a location of the specific main area is determined as a specific unit area among all the unit areas by referring to time information of the specific personal history which includes information on a start point of time thereof or an end point of time thereof, and wherein locations of the one or more sub areas corresponding to the specific main area are determined as a group of unit areas, which are located near the specific main area and branching away from the baseline, among all the unit areas by comparing time information and category information of the subordinate personal histories with those of the specific personal history.

23. The server of claim 22, wherein the user information exposing part allows the respective main areas for indicating existence of the main information to be displayed in different colors depending on property categories of the respective personal histories.

24. The server of claim 22, wherein the user information exposing part sets the specific main area for indicating existence of the main information on the specific personal history and the sub area for indicating existence of subordinate information on the subordinate personal histories belonging to the specific personal history to have identical visual effects with each other by default and have different visual effects from other areas with different property categories.

25. The server of claim 24, wherein the user information exposing part displays a color in the specific main area for indicating existence of main information on the specific personal history and those in the sub areas for indicating existence of subordinate information on the subordinate personal histories belonging to the specific personal history differently from those in the said other areas with the different property categories.

26. The server of claim 22, wherein the user information exposing part allows one or more main areas for indicating existence of main information on academic background, work experiences, and one or more personal goals related thereto to be displayed on one side of the baseline, and allows one or more main areas for indicating existence of main information on one or more personal histories and one or more personal goals excluding the academic background, the work experiences, and the one or more personal goals related thereto to be displayed on the other side of the baseline.

27. The server of claim 22, wherein, even if the one or more main areas for indicating existence of main information and the one or more sub areas for indicating existence of subordinate information do not exist at all, the template providing part allows the baseline to be displayed and allows lattice-shaped empty unit areas to be displayed at the same time.

28. The server of claim 27, wherein the user information exposing part allows the one or more main areas for indicating existence of the main information and the one or more sub areas for indicating existence of subordinate information to be displayed through a certain unit area selected among the lattice-shaped unit areas.

* * * * *